United States Patent [19]
Nakajima et al.

[11] Patent Number: 5,269,862
[45] Date of Patent: Dec. 14, 1993

[54] FABRICS HAVING A SPECIAL STRUCTURE AND METHODS OF PRODUCING THE FABRICS

[75] Inventors: Tamotu Nakajima, Kouka; Miyoshi Okamoto, Takatsuki; Hisao Shimizu, Otsu, all of Japan

[73] Assignee: Toray Industries, Inc., Japan

[21] Appl. No.: 689,061

[22] PCT Filed: Oct. 18, 1989

[86] PCT No.: PCT/JP89/01066
§ 371 Date: Jun. 11, 1991
§ 102(e) Date: Jun. 11, 1991

[87] PCT Pub. No.: WO91/05897
PCT Pub. Date: Feb. 5, 1991

[51] Int. Cl.$^5$ ............................................. B32B 31/00
[52] U.S. Cl. ........................................ 156/155; 156/191; 156/193; 156/291; 156/304.5; 156/304.7
[58] Field of Search ............... 428/181; 156/155, 191, 156/193, 291, 304.5, 304.7, 305

[56] References Cited

U.S. PATENT DOCUMENTS 4,443,506  4/1984  Schmolmann et al. ............ 428/181
4,780,346  10/1988  Denoel ............................... 428/176
5,059,378  10/1991  Petterson et al. .................. 428/176

FOREIGN PATENT DOCUMENTS 57-46393  10/1982  Japan.

*Primary Examiner*—James J. Bell
*Attorney, Agent, or Firm*—Austin R. Miller

[57] ABSTRACT

The present invention relates to fabrics having a special structure, methods of producing the fabrics, and various articles including clothes comprising such fabric. Specifically, the fabrics of the invention are characterized in that many narrow strips forming an overlapping structure are combined together so that each overlap between adjacent narrow strips provides an opening in the width direction of the strips. The methods of producing the fabrics are characterized in that narrow strips are put one on top of another while slightly shifting the positions thereof to form an overlapping structure, followed by combining the adjacent narrow strips while maintaining the overlap. Where used as material for clothes, for instance, these fabrics produce clothes that prevent the skin of the wearer from being exposed directly to sunlight and rain and have unique features including a high fashionability and a high air permeability ensuring a good ventilation. In addition to clothes the fabrics also serve to produce novel variations of various articles including clothing items other than clothes, bedclothes, soil and sand fixing sheets, agricultural and horticultural greenhouse, footwear, perishable storage containers, beach umbrellas, tents, filtering materials, chair covering materials, partitions and curtains.

5 Claims, 7 Drawing Sheets

S

S

S

FABRICS HAVING A SPECIAL STRUCTURE AND METHODS OF PRODUCING THE FABRICS

This invention relates to a fabric having a special structure to methods of producing the fabric, and various articles including clothing made of fabrics having high air permeability.

TECHNICAL FIELD

The invention relates to fabrics having a special structure, methods of producing the fabrics, and various articles including clothing made of fabrics having the special structure.

When applied to clothing, for example, fabrics having a special structure according to the invention can provide clothing with characteristic features not available from conventional clothing, including the ability to prevent exposure of the skin of the wearer directly to sunlight or rain to maintain high air permeability, and which are highly fashionable. In the case of clothing, the invention relates to fabrics having a novel structure which are suitable for outdoor wear, including sportswear such as golf wear, baseball uniforms, baseball undershirts, and tennis wear, casual articles such as T-shirts and polo shirts, and rainwear such as a raincoat.

In addition to these clothing articles, the fabrics of the invention can provide various other unique articles if good use is made of the functional characteristics obtained from their unique fabric structure.

Various unique materials made of fabrics of the invention can provide different novel products not currently available in each relevant area, including various clothing articles other than those stated above, bedclothes, earth and sand fixing sheets, agricultural and horticultural greenhouses, footwear, perishables storage containers, beach umbrellas, tents, partitions, filtering materials, chair covers, and curtains.

BACKGROUND ART

To facilitate an understanding thereof, the novel functional features of the fabrics of the invention are described in detail below, by exemplifying clothes made of such fabrics.

Conventionally, priority has often been given to fashionability, including color and design, and brand names, and manufacturers have simply relied on the primary characteristics of fiber materials (such as the water absorbing ability of cotton) when producing articles having a permeability, waterproofness and other functional properties.

No fibrous materials, however, are available which have satisfactory functional properties allowing the products to act effectively in summer when the wearers, exposed to strong sunlight, tend to perspire profusely. Women, in particular, often wear clothes with long sleeves to avoid a suntan, and therefore, women's clothes are required to have particularly good properties including a high air permeability and comfortability. Mesh-type fabrics are available to achieve a high air permeability, but are not widely used because the skin or underwear can be seen through them, or because the wearers may suffer from a mesh-like tan.

Recently, many types of closely-woven fabrics with moisture permeability and water repellency have been made commercially available as materials for sportswear, rainwear and umbrellas, but these fabrics have a low air permeability (windbreak performance) and thus are regarded as completely different from the fabrics of the invention, which have a high air permeability. Materials with low air permeability can not provide the comfort associated with high air permeability, even though providing good windbreak performance.

Therefore, there are no fabrics available which have high fashionability as well as high air permeability, together with light-screening ability and waterproofness, as these properties generally conflict with each other.

The above examples are limited to clothing, but fabrics having high air permeability together with light screening ability and waterproofness as described above, if made available, will be useful for a wide variety of applications, in addition to clothing, in various industrial areas.

DISCLOSURE OF INVENTION

As a solution to the conventional technical problems described above, the invention is intended to provide novel fabrics which have high air permeability together with good light-screening ability and high waterproofness. In the case of clothing, for example, the invention provides fabrics suitable for producing functional and fashionable clothes that can screen the wearer from direct sunlight to prevent tanning of the skin, allow the wearer to feel cool and comfortable in the summer due to high air permeability, and have a novel, unique and fashionable appearance.

The invention also relates to methods of producing such fabrics as described above.

Furthermore, the invention also relates to various novel articles, including clothing and other different products, which are produced by making good use of the unique functional features of these fabrics resulting from their characteristic structure.

Accordingly, the invention has the following features.

The fabrics of the invention have a special structure which consists of a large number of overlapping narrow strips which are connected to form a fabric in such a way that the overlapping portions provide openings in the direction of the width of the narrow strips.

To produce fabrics with the special structure of the invention, narrow strips are placed one on top of another while displacing same so that they partially overlap each other to form an overlapping structure, and then adjacent narrow strips are connected while maintaining that structure, to thereby produce a fabric.

The articles of the invention include clothes, various clothing items other than clothes, bedclothes, earth and sand fixing sheets, agricultural and horticultural greenhouses, footwear, perishables packaging materials, beach umbrellas, tents, partitions, filtering materials, chair covers and curtains, that are made of fabrics of the invention.

With such features as described above, fabrics having an overlapping structure consisting of narrow strips, as proposed herein, can provide the desirable actions and effects as described below.

(1) When used as material for clothes, they prevent the skin of the wearer from suffering from tanning or roughness, because they intercept direct sunlight.

(2) They serve to produce comfortable clothes which have high air permeability but prevent the skin from being seen.

(3) They have a light-screening ability, waterproofness and moisture permeability together with high air permeability.

(4) They have an uneven surface which provides a three-dimensional, dry appearance, and serve to produce clothes without a sticky touch to the skin of the wearer.

(5) When combined with other materials of different types or colors, they can have multiple functions with a very high fashionability not available from conventional fabrics.

With the many features described above, fabrics of the invention provide materials for a variety of clothing items including sportswear such as golf wear, tennis wear, baseball uniforms and baseball undershirts, rainwear such as raincoats, casual clothes such as summer sweaters, T-shirts and polo shirts, caps, hats and gloves.

In addition to these applications, they can effectively provide materials for bedclothes, earth and sand fixing sheets, agricultural and horticultural greenhouses, footwear, perishables packaging materials, beach umbrellas, tents, partitions, filtering materials, chair covers, and curtains, as described above.

BRIEF EXPLANATION OF THE DRAWINGS

FIGS. 9-13 show examples of bedclothes, earth and sand fixing sheet, agricultural or horticultural greenhouse, footwear, and perishables storage bag, respectively.

MOST DESIRABLE STRUCTURE FOR THE INVENTION

Figure 1A:
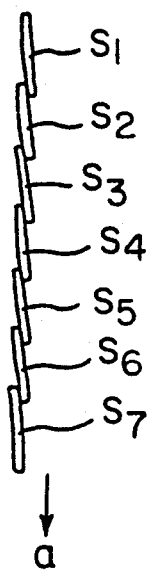
FIG. 1(A) shows a cross section of a fabric of the present invention which consists of overlapping narrow strips connected to each other. The cross section schematically shows the fabric's special structure which is like a tiled roof.

The special structures of this invention are described in more detail below, with reference to the drawings.

A fabric of this invention has a special structure which consists of a large number of narrow strips which overlap each other and are connected to form a fabric sheet in such a way that the overlapping portions provide openings in the direction of the width of the narrow strips.

Any kind of narrow strips in a sheet form with a smaller width than length can serve for the invention, and there are no specific limitations on their widths. In general, desirable materials include woven, knitted or non-woven fabric, film and plastics in the form of thin sheet with a width of 1-200 mm. Of these materials, woven knitted and non-woven fabrics are most desirable because they can maximize the effect of the invention and can be handled easily when manufacturing products. Knitted, woven and non-woven fabrics are particularly desirable when used to produce such articles as clothes, other clothing items, bedclothes, perishables storage containers, beach umbrellas and tents.

However, the optimum width of narrow strips as described above should vary with the actual application of the fabrics of the invention. For large-size articles such as large-type agricultural or horticultural greenhouses and large-type earth and sand fixing sheets, for example, the optimum width of the narrow strips used may be greater than the width range described above.

Also, desirable materials for narrow strips may vary with application. High-strength non-woven fabrics, film or thin plastic sheets may be desirable for such articles as agricultural or horticultural greenhouses, earth and sand fixing sheets and filter mediums.

Concerning production methods, narrow strips of woven fabric, for example, may be obtained by directly producing narrow strips with a desired width with a ribbon or tape weaving machine, or by producing a fabric with a wide fabric weaving machine followed by melt-cutting to a desired width on the weaving machine or with a melt-cutter, or by weaving soluble fiber into a fabric along parallel lines followed by treating the fabric with solution that dissolves the soluble fiber to provide narrow fabric strips with a desired width. Practically, an appropriate production method may be selected after considering the ease of the production operations and the specifications of the required narrow strips. For any type of material, including woven, knitted or non-woven fabrics, film and thin plastic sheets, proper narrow strips may be obtained either by producing large sheets and then cutting them into strips, or by directly producing narrow strips.

The desirable width range for these narrow strips is as described above. A more detailed explanation is given below concerning their application to clothes, other clothing items, bedclothes, and other small articles such as footwear and perishables storage containers. Widths smaller than 1 mm are generally undesirable because it is difficult to produce such narrow strips, and because it is usually difficult to form a fabric from such narrow strips. Widths greater than 200 mm are also generally undesirable because the resultant fabrics may not be significantly better than conventional fabrics with respect to functional and fashionable features as well as air permeability, which is the most important property of the fabrics of the invention. Thus, widths of 2–100 mm, or 5–70 mm in particular, are desirable for these articles.

These narrow strips may have an irregular cross section with a moderately uneven or wavy surface. For example, the cross section may be either a flat rectangle or in the form of "Λ", ">", or combinations of these shapes such as "W", or may have other bent forms such as "]", ")", ")", "]", "}", "⌡", "ʃ", "I" and "∼". These narrow strips generally may be single-layer sheets, but also may be double-layer sheets such as tubes and double fabrics. Here, the width of a tube-like strip is defined as its diameter.

Where applied to articles used in contact with the skin, including clothes and other clothing items, narrow strips are preferably of a fibrous material such as woven, knitted or non-woven fabric, because they are agreeable to the touch. Desirable fibers used as a base material for these narrow strips are synthetic fibers including polyethylene terephthalate and its copolymers (including copolymers with isophthalic acid, 5-sodium sulfoisophthalate, etc.), polybutylene terephthalate and its copolymers, other various polyesters, polyamides such as nylon 6, 11, 12, 66 and 610 and their copolymers, acrylic polymers, polyurethane, polyethylene, ultra-high molecular weight polyethylene, polypropylene, their copolymers, and polyvinyl alcohol; regenerated cellulosic fibers including rayon and cuprammonia rayon; semisynthetic fibers including acetate and triacetate, and natural fibers including cotton, hemp, silk and wool. These fibers may be used separately or in combination in the form of composite, combined filament yarn fabric, blended yarn fabric, twisted union yarn fabric or mixed-woven fabric.

Of these, narrow strips of composite yarn of polyester fiber and polyamide fiber, those of composite yarn of highly shrinkage polyester-isophthalic acid copolymer fiber combined with other types of fibers such as poorly shrinkage ones, and those of water-sensitive fiber made by spinning of low-saponification value polyvinyl alcohol are particularly desirable because they can shrink during processing to form a bulky fabric, leading to favorable bulky, dry-touch textures. As a result, the fabric will not cling to the skin and has a large porosity. Also, the fabric will have higher air permeability and will be agreeable to the touch, making it possible to produce very comfortable clothes. Another way of obtaining bulky fabrics is to form narrow strips using bulky yarns such as woolen yarns produced from single multifilaments.

A fabric with a "overlap structure" of narrow strips as proposed herein consists of many narrow strips overlapping each other like a tiled roof. Its cross section is like that of a mino (straw raincoat).

Unique effects and functional features resulting from such a structure are explained below with reference to the drawings.

Figure 1B:
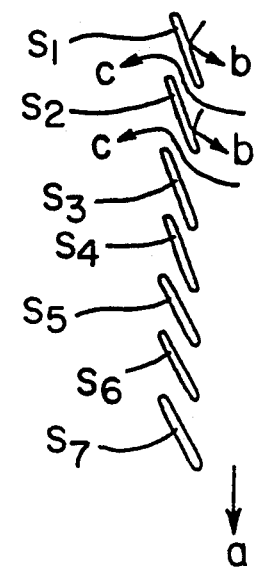
FIG. 1(B) illustrates a cross section of a non-connected portion of a fabric of the invention where overlapping narrow strips are separated from each other. This cross section schematically shows that many narrow strips overlap each other with appropriate gaps (openings) maintained between adjacent strips.

FIG. 1(A) shows a cross section of sewn narrow strips that constitute a fabric with a special overlap structure of the invention, and schematically illustrates narrow strips $S_1$, $S_2$, $S_3$, $S_4$, $S_5$, $S_6$ and $S_7$ overlapping each other to form a structure like a tiled roof or a mino. FIG. 1(B) shows a cross section of a non-sewn portion of narrow strips that constitute a fabric with a special overlap structure of the invention, and further, schematically illustrates narrow strips $S_1$, $S_2$, $S_3$, $S_4$, $S_5$, $S_6$ and $S_7$ overlapping each other with proper gaps therebetween.

As seen from these drawings, a fabric of the invention consists of many (more than one) narrow strips which overlap each other while maintaining an opening in the width direction of the narrow strips.

With this special structure, a fabric of the invention, when exposed to rain for example, prevents an ingress of rain drops (arrow b) while allowing air to flow therein (arrow c), leading to a high water repellence and high air permeability. Arrow a in FIG. 1(A) and (B) shows the "downward" direction.

Figure 5:
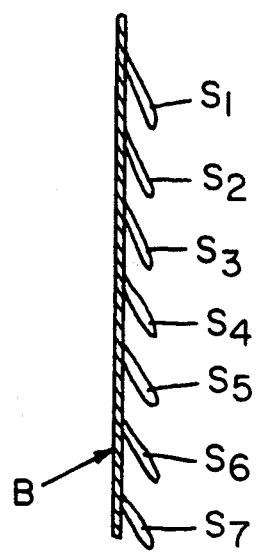
In FIG. 5 a cross section of a fabric structure which is not based on the present invention is illustrated schematically to show the difference thereof to the structure of the invention.
Figure 6A:
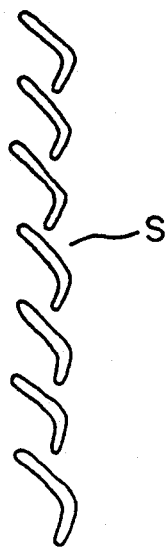
FIG. 6(A), (B), (C), (D) and (E) gives cross sections of non-sewn portions of various types of fabrics with special structures consisting of narrow strips as proposed herein.
Figure 6B:
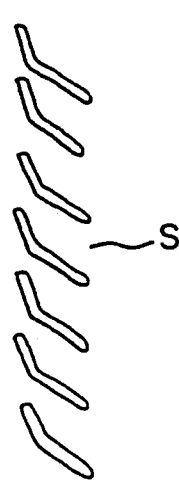
Figure 6C:
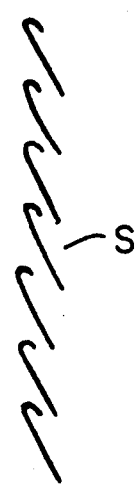
Figure 6D:
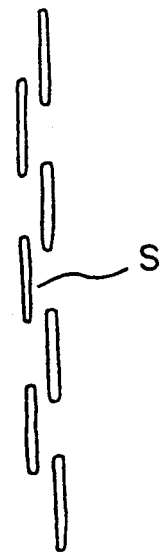
Figure 6E:
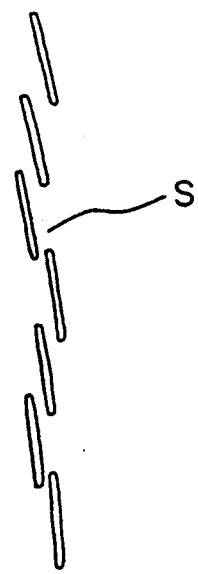

Compared to this, FIG. 5 schematically shows a cross section of a fabric structure which is not based on the present invention. The overlap structure given in FIG. 5, in which many narrow strips $S_1$, $S_2$, $S_3$, . . . overlapping each other are bonded to base sheet B, have no openings in the width direction in the overlap portion of the narrow strips. Such a structure cannot increase the air permeability as indicated by arrow c in FIG. 1(B), even though it serves to repel raindrops as indicated by arrow b, and thus it cannot achieve a high air permeability together with a light-screening ability and waterproofness as intended in the present invention. In this example, a high air permeability could not be achieved even if an air permeable fabric is used as the base sheet B. In any case, a structure comprising a based sheet is obviously different from the fabrics of the invention with respect to expected effects.

Figure 2:
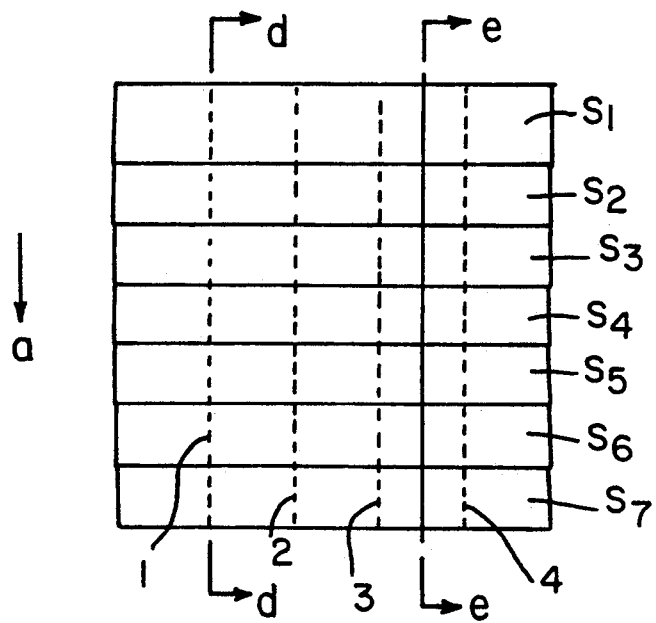
FIG. 2 schematically illustrates a top view of a special fabric with the overlap structure as depicted in FIGS. 1(A) and (B). As seen from this top view, the narrow strips are machine sewn together in the width direction of the strips along parallel lines aligned at regular intervals.

FIG. 2 schematically shows, as an example, a top view of a special fabric with an overlap structure of the invention as given in FIG. 1(A) and (B). The fabric in FIG. 2 consists of narrow strips sewn downward in the width direction thereof, and these strips are sewn with a machine along dashed lines 1, 2, 3 and 4. The cross section indicated by d—d along one of the sewing lines in FIG. 2 corresponds to that shown in FIG. 1(A), and the cross section e—e, which is spared from the sewing lines, corresponds to that given in FIG. 2(B).

The narrow strips of fabric having the a special structure of the invention may overlap each other either regularly or irregularly with varying overlapping widths, as long as a proper overlapped structure is maintained.

Figure 7A:
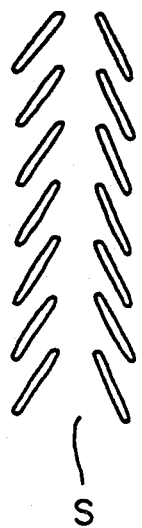
FIG. 7(A), (B) and (C) gives cross sections of non-sewn portions of other various types of fabrics with special structures consisting of narrow strips as proposed herein.
Figure 7B:
Figure 7C:

FIGS. 6 and 7 illustrate a cross section of a nonsewn portion of narrow strips contained in some variations of the basic fabric S of the invention. FIG. 6(A), (B) and (C) shows an example in which narrow strips with a "Λ"-shaped cross section and the narrow strips in FIG. 6(D) and (E), although in a flat form, overlap each other irregularly, unlike the case shown in FIG. 1. Two adjacent strips form a repeating overlap pattern in FIG. 6(D), but a repeating pattern consists of three strips in FIG. 6(E). The examples in FIG. 7(A), (B) and (C) show two layers (inside layer and outside layer), each of which has an overlap structure consisting of narrow strips.

Various processes are available for producing fabrics with an overlap structure consisting of many narrow strips, and there are no specific limitations on the methods used to produce these fabrics. The most practical way may be to put narrow strips one on top of another while slightly shifting their positions to form an overlap structure, followed by connecting them while maintaining the overlap structure.

More specifically, narrow strips impregnated with a water-soluble adhesive (such as an adhesive based on polyvinyl alcohol or acrylic resin) may be put one on top of another on a tube or other appropriate supporting roll with a surface coated with, for instance, fluoroplastics such as polytetrafluoroethylene while rotating the tube so that the strips are put one on top of another with a slight misalignment therebetween, followed by drying and cutting along the axis of the tube to provide a sheet with an overlap structure consisting of temporarily bonded narrow strips. A fabric sheet consisting of temporarily bonded strips thus obtained is then sewn in the "downward" direction, in which the strips will not be turned up during the sewing operation, along lines at required intervals, in order to fix the narrow strips with regular shifts or irregular shifts maintained therebetween. Then, the fabric sheet is immersed in heated water to dissolve and remove the water-soluble adhesive used for the temporary bonding, to form a fabric with an overlap structure of the present invention.

Figure 8:
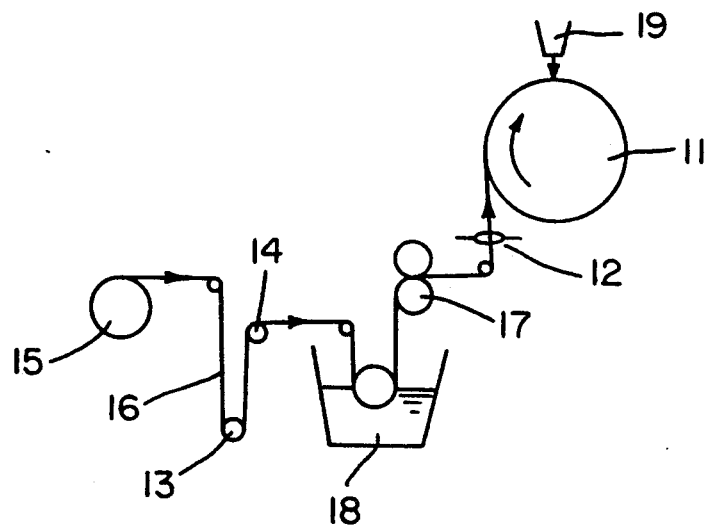
FIG. 8 illustrates an example of assembling a temporarily-fixed overlap structure as a step for producing a fabric with a structure of the invention.

This is explained in more detail below with reference to the drawings. FIG. 8 illustrates a process that effectively produces a sheet consisting of temporarily bonded narrow strips. In the FIG. 8, a guide 12 moving at a constant speed and tension rolls 13 and 14 are provided near a cylinder 11, which rotates at a constant speed, and narrow strips 16 wound on a collared bobbin 15 are supplied through rolls 13 and 14 and guide 12, so that the narrow strips 16 are wound up on the constantly rotating cylinder 11 with a desired overlap therebetween.

In FIG. 8, a temporary bonding adhesive tank 18 and squeezing roll 17 are provided so that narrow strips impregnated with the temporary bonding adhesive form an overlap structure on the cylinder, followed by drying the temporary bonding adhesive in hot air supplied though hot water outlet 19 to ensure a temporary fixing. Thus, a temporary fixing is achieved during and/or after the winding of the narrow strips on the cylinder.

In view of the expected effects and workability, a water-soluble adhesive such as one based on polyvinyl alcohol or acrylic resin may be most desirable for the temporary fixing. Aqueous solution prepared by diluting the adhesive to an appropriate concentration may be applied to the narrow strips during and/or after the winding of the narrow strips on the cylinder, followed by drying. This may be performed while separating the strips from the cylinder. The application may be carried out by impregnation or an appropriate spreading process such as spraying, padding or brushing. A proper process may be selected after considering its workability or other features. The narrow strips which are temporarily fixed by, for instance, exposure to normal temperature air or hot air after the application of the water-soluble adhesive are then cut or melt-cut in the transverse direction and removed from the roll to provide a fabric sheet with an overlap structure consisting of temporarily fixed narrow strips.

Next, the temporarily bonded narrow strips in the fabric with an overlap structure are connected together. There are no specific requirements for the connecting method to be used. The use of a sewing machine is generally desirable because of its high availability. For instance, it is desirable to sew the narrow strips in their width direction along parallel lines aligned at appropriate intervals to combine the strips. In this case, the strips should preferably be sewn "downward", or in such a direction that the strips will not be turned up during sewing. There are no specific requirements for the intervals between sewing lines, and an appropriate interval may be selected depending on the use and purpose of the fabric. Also, there are no specific requirements for the sewing pattern, and appropriate pattern such as linear, checked, checkered or cross-stitched may be selected depending on the use and purpose of the fabric. Sewing may be carried out by a general-use sewing machine with one needle or by a multiple-needle sewing machine, such as kilting machine, that can sew along several lines simultaneously.

Another way of combining the narrow strips is the use of a high-frequency or supersonic sewing machine.

The use of a sewing machine is not the only way available for combining the narrow strips, but it may also be effective to use an adhesive for bonding them together. The use of a sewing machine, however, is desirable in most practical cases because it can combine them in the downward direction of the overlap structure, which serves to minimize the number of wrinkles and is easy to perform.

Also, they may be combined by continuous or discontinuous fusion bonding with thermoplastic fiber. A fusion bonding method using vibrational energy caused by supersonic wave may be useful in most cases.

Where narrow strips are combined by sewing into a fabric, a tape for reinforcement may be put on the sewing line, followed by sewing of the narrow strips together with the reinforcing tape. Furthermore, it also may be desirable to perform ironing and/or heat-pressing in the downward direction of the overlap structure after forming a fabric to further reinforce the overlap structure.

A fabric obtained through such processes as described above is then subjected to another process to remove the temporary bonding. When a water-soluble adhesive is used for temporary bonding, the water-soluble adhesive used for the temporary bonding is removed by immersing the fabric in hot water to dissolve the adhesion. In this case, appropriate agents such as desizing agent, antistatic agent and softening agent, may be used. After adequate desizing for complete removal of the temporary adhesive, the narrow strips are dried in air or hot air to form a fabric with such a structure as shown in FIG. 1(A) or (B).

The process for removing the temporary bonding of narrow strips overlapping each other may be performed after producing secondary products from the fabric sheet consisting of temporarily bonded narrow strips. For instance, secondary products such as clothes or other clothing items may be produced from fabric sheets consisting of narrow strips combined in a temporarily-bonded state, followed by treatment of the products in a process for dissolution and removal of the water-soluble adhesives. Such a procedure, in which temporary bonding is removed after the production of secondary products, may be more desirable in most practical cases because of the ease of operations for producing the secondary products.

It also may be desirable to subject a fabric of the present invention to a water repellency treatment depending on the use of the fabric. Water repellency treatment can be easily carried out by applying an appropriate agent, such as silicone- or fluorine-based one, by means of spraying, padding, immersion or coating. In particular, padding is most desirable because it can apply a water repellency agent uniformly and also because its application in the downward direction of the overlap structure, as in the case of sewing as stated above, can be effective for preventing the formation of wrinkles. Thus, the padding process may be the best due to these advantages.

In producing such various secondary products as stated above from fabrics with an overlap structure consisting of narrow strips as proposed herein, such fabrics may be used solely or together with other fabric materials.

Such other fabric materials should preferably be appropriate general-use plain fabrics. In case of such secondary products as clothes and other clothing items, it may be desirable that an appropriate plain fabric be used at portions that are frequently subjected to strong bending motion while a fabric of the invention be used at flat portions that are free of strong binding motion. In rainwear, for instance, conventional waterproof material may be used at such portions as shoulders, knees and elbows, while using a fabric with an overlap structure of the invention at other flat portions in order to maximize the effect of the fabric of the invention.

Figure 3:
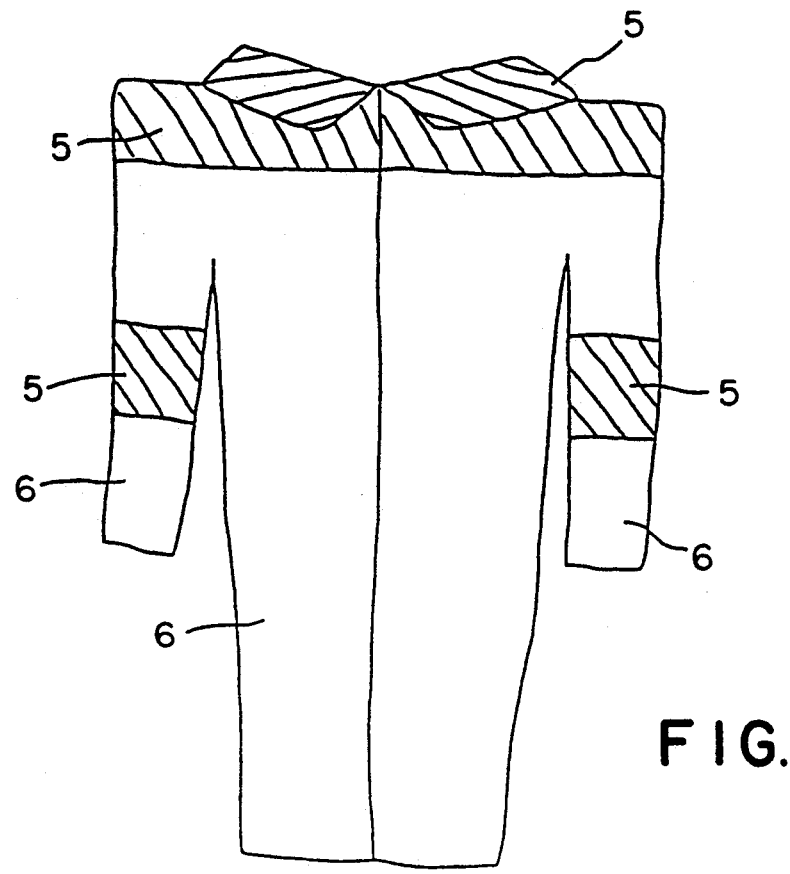
FIG. 3 schematically shows the external appearance of a raincoat made of a fabric with a special structure of the invention which will be described later in Example 2.

FIG. 3, for example, schematically illustrates the appearance of a raincoat of the invention produced by sewing as described later in Example 2. Plain waterproof sheets made of high-density fabric 5 are used at flexible portions such as collar, shoulders and elbows while fabric with an overlap structure of the invention 6 is used at other flat portions. This examples shows how both the characteristics of a fabric of the invention and those of another material can be effectively exploited.

Where a raincoat is produced solely from a fabric of the invention, combined-woven fiber with a low melting point may be used as material for narrow strips, and the fabric used at flexible portions such as collar, shoulders and elbows as stated above is heat-treated to melt and join the low melting point components so that the waterproofness is improved due to blinding, joining and increased density.

Where fabrics of the invention are used for the production of such secondary products as clothes and other clothing items, it may be practical to use the fabric in such a way that the downward direction of the overlap structure is virtually consistent with the downward direction of the secondary products. Note, their use is not limited to such a direction, and they may be used in any other arrangement depending on such factors as fashionability and appearance.

As described above, the fabrics of the invention have an overlap structure consisting of narrow strips which can shade direct sunlight and ensure high air permeability. Furthermore, they can be imparted with other desired properties such as water repellency, oil repellency and moisture permeability by performing appropriate treatment. They also can have many other good features including dry, rough surface textures and unique appearance together with fashionability and therefore can be useful for a variety of applications including sportswear such as golf wear, tennis wear, baseball uniforms and baseball undershirts; rainwear such as raincoats; casual clothes such as summer sweaters, T-shirts and polo shirts; and other articles such as caps, hats and gloves.

Figure 4A:
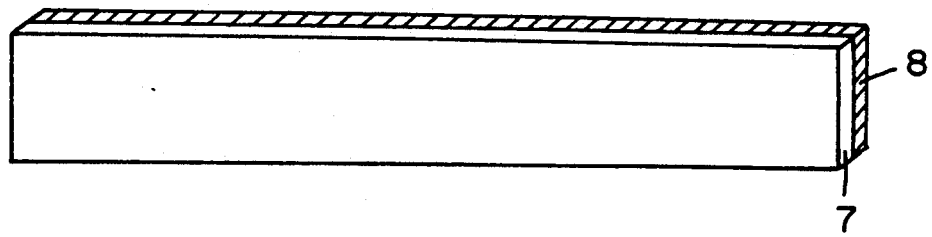
FIG. 4(A) and (B) gives an oblique view of a structural example consisting of narrow strips of a few different materials and colors.
Figure 4B:
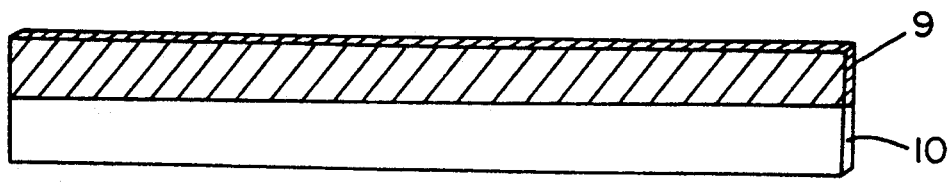

The fabric and secondary products, including clothes and other clothing items, of the present invention may be of reversible type. Thus, fabrics of the invention can provide very unique material and products including clothes and other clothing items having two useful sides.

Where narrow strips having two sides each of which are made of different materials, such as material 7 mainly for one side of the strips and material 8 mainly for the other side in FIG. 4(A), it will be easy to produce clothes having an outer surface and an inner surface each of which have a different characteristic from each other. Such narrow strips may be produced easily from, for instance, a double-woven fabric. In a typical case, such as fiber as cotton may be used as material for the inside surface thereof (in contact with the skin) and a water repellent material such as polyester may be used for the outside surface thereof. In another example, the fiber used in the outside surface of the narrow strips may be different from that used in their inside surface with respect to shrinkability and other properties. In such a case, the narrow strips may have a bent structure such that large openings may be formed between the strips so that the resultant fabric can have high air permeability.

Where each narrow strip consists of two narrower strips made of different materials each arranged in a side by side structure in a widthwise direction, as shown in FIG. 4(B), material 9 used for the upper half thereof and forming the inside surface of the resultant fabric, may be cotton fiber while material 10 used for the lower half thereof may be water-repellent polyester fiber. In this case, a synergetic effect due to two different properties, i.e., sophisticated touch and water repellency, can be achieved very effectively. Where a narrow strip consists of two narrower strips of different materials as described above, the boundary between the two materials may not be consistent with the middle line, but the boundary line may be at any desirable position in the width direction.

To produce a fabric with an overlap structure particularly high in bulkiness and air permeability, narrow strips of polyurethane fiber may be temporarily combined under an appropriate tension followed by sewing of the strips and removal of the temporary bonding to form a fabric with an overlap structure. In such a fabric, the narrow strips will have a wavy form, resulting in large gaps between them. Another good way of obtaining large gaps is putting narrow strips of polyurethane fiber and those of other fiber one on top of another alternatingly while applying a tension to the polyurethane fiber strips followed by the formation of a fabric and removal of the temporary bonding so that the two types of strips have different wavy shapes.

A fabric with large gaps may also be produced effectively by combining narrow strips of highly-shrinkable fiber and those of poorly-shrinkage fiber appropriately, followed by heat treatment. Large gaps may be formed due to the difference in the degree of shrinkage between the two types of strips.

Highly fashionable, colorful fabrics or secondary products, including clothes and other clothing items, may be obtained by using a fabric having an overlap structure consisting of narrow strips of different colors or having an overlap structure consisting of narrow strips which have two sides with different colors and or which have different colored portions formed in the widthwise direction as illustrated in FIG. 4(A) and (B).

Furthermore, a fabric with novel functional and colorful features that are not available in conventional fabrics may be produced by combining several types of narrow strips which are different in color, material and other properties.

Where a fabric of the present invention is used to form clothes or other clothing items, the number of narrow strips used in a piece of clothes or a clothing item is preferably in the range of 2 (incl.) to 1500 (incl.), more desirably in the range of 2 (incl.) to 1000 (incl.), and still more desirably in the range of 5 (incl.) to 700 (incl.). Several to 30 or so narrow strips are preferably contained in every 10 cm length of fabric.

The use of too many narrow strips is not desirable because it may lead to problems such as a lower fabric strength, lower number of effective gaps for ventilation due to an increased number of strips per unit length of the resultant fabric, and increased weight of the fabric.

There are no specific requirements for the size of each narrow strip, but those with a surface area of 1.1 $mm^2 - 8 \times 10^4$ $mm^2$ are generally desirable for small articles including clothes and other clothing items. It is generally difficult to produce a desired overlap structure from narrow strips with a surface area of less than 1.1 $mm^2$, but a fabric consisting of narrow strips larger than $8 \times 10^4$ $mm^2$ will lose its good features and has fewer significant differences from conventional plain fabrics, though the desirable strip size varies with the application of the resultant fabric.

The fabrics of the present invention can be applied to a wide variety of articles, as described below.

First, completely novel bedclothes with a high air permeation for good ventilation, together with a favorable heat insulation and fashionability, can be produced from a fabric of the invention.

More specifically, novel bedclothes, including blanket, bed sheet, fabric and side cloth for futon (Japanese quilt), pajamas, nightdress, nightgown, bathrobe, and pillowcase, particularly for summer use can be produced.

For such articles as bed sheets, pajamas and towel-cloth blankets, in particular, it is desirable to use narrow strips of cotton towel cloth because comfortable products with an agreeable touch can be produced. Where an article made solely of such towel cloth strips may have some problems, including a lack of effective gaps and excessive flexibility causing the fabric to cling to the skin, it may be desirable that appropriate narrow strips of, for instance, woven, knitted or non-woven fabric more firmly formed with a stronger nerve than the towel-cloth strips be used in combination with the towel-cloth strips in an alternating arrangement in a checked pattern or in other appropriate ways.

Furthermore, bedclothes with multiple functions can be produced by using several types of narrow strips of different materials in combination. For instance, bedclothes with an agreeable dry touch and good water absorbing ability can be produced by combining arrow strips made of polyester thread with those of cotton.

Figure 9:
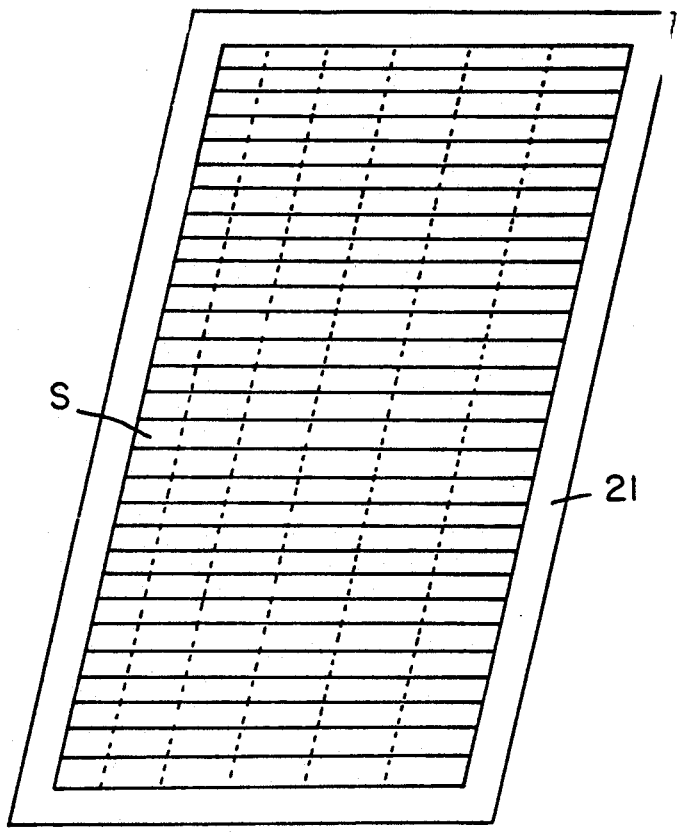
FIGS. 9-13 illustrate various articles made particularly of fabrics with a special structure of the invention. Specifically.

The bedclothes of the invention are produced by cutting and sewing a fabric with a special structure as described above. These bedclothes can be produced easily and in particular, those for summer use can ensure coolness and comfortability. FIG. 9 schematically illustrates a towel-cloth blanket made of fabric S of the present invention.

Second, a novel soil and sand fixing sheet that has high water permeability and effectively hold soil and sand can be produced from a fabric of the invention.

More specifically, it is possible to produce a soil and sand fixing sheet with a special structure that prevents soil and sand from flowing out therethrough, and serves to discharge soil water and rain water from the ground, while leaving an appropriate moisture in the ground.

Such soil and sand fixing sheets include drainage materials for building and engineering works for the construction of retaining walls, tunnels, roads, culverts, golf links, water supply/drain channels, slopes and weak ground treatment, other drainage materials such as for coal accumulation sites, and soil water removal sheets for flower pots.

Figure 10:
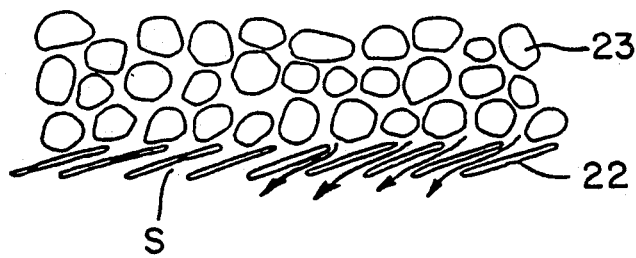

FIG. 10 schematically explains how a soil and sand fixing sheet of the present invention can serve to hold soil and sand while retaining a high water permeability. Soil and sand layer 23 is supported by soil and sand fixing sheet 22, which comprises a fabric S of the invention.

With such a unique structure, the soil and sand fixing sheet of the invention schematically shown in FIG. 10 maintains narrow gaps between the narrow strips, which provide channels for water drainage as indicated by arrows, while retaining particles in the ground layer, including soil and sand, which are greater than a certain size. In addition, with the multiple layer structure consisting of narrow strips, the sheet can work as a filter free of clogging. Thus, soil and sand fixing sheet 22 prevents soil and sand from flowing out while maintaining good performance for drainage and water permeation.

Based on this mechanism, fabrics of the invention can serve as a filter for various applications.

Third, fabrics of the invention can be useful in producing novel agricultural or horticultural greenhouses which provide good ventilation and shade and are highly suitable for the cultivation of certain agricultural or horticultural plants.

No agricultural or horticultural greenhouses are available which are suitable for the cultivation of, for example, seedlings of such widely known foliage plants as benjamin tree, yucca, dracaena tree and concinna, which grow well in a well-ventilated, well-shaded environment free of direct sunlight. In general, conventional greenhouse materials with a good light screening ability have a low air permeability, and vice versa.

Unlike these, the fabrics of the invention can serve to produce an agricultural or horticultural greenhouse which provide an effective shade while maintaining a good ventilation.

The agricultural and horticultural greenhouses of the invention are described in detail below.

The agricultural and horticultural greenhouses as proposed herein include covers, tents and greenhouses for protection and cultivation of seedlings of rice and vegetables for agricultural production; covers, tents and greenhouses for protection and cultivation of seedlings of other plants including foliage plants, flowers, garden trees and fruit trees; and other types and sizes of greenhouses.

Figure 11:
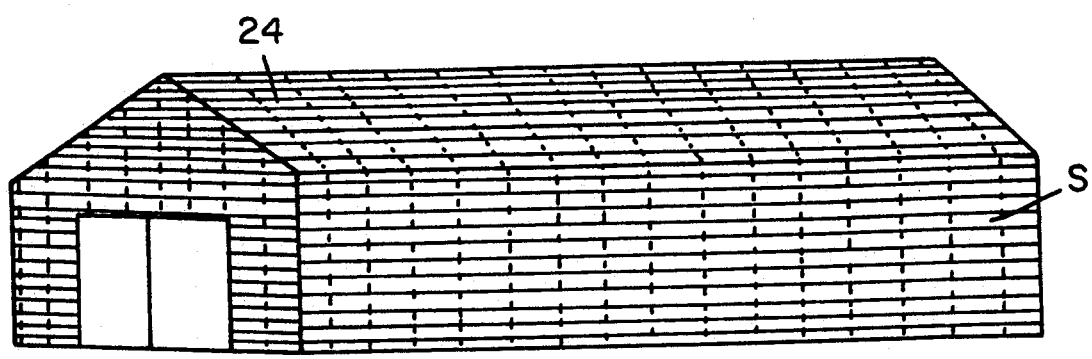

FIG. 11 schematically illustrates an example of greenhouse for seedlings of foliage plants and flowers as proposed herein. In FIG. 11, fabrics with a special structure of the invention are used as exterior materials including roofing for greenhouse 24.

For these agricultural and horticultural greenhouses of the invention, in particular, the use of a combination of various narrow strips of different materials and colors will permit the construction of completely novel agricultural and horticultural greenhouses which have light-screening ability together with good ventilation and also has beautiful and fashionable appearance with various colors. By making use of such color features, it will also be easy to construct greenhouses which have different colors for identification of the plants cultivated in them.

If narrow strips of an appropriate size and of an appropriate color or appropriate different colors are used at appropriate portions, greenhouses useful under various conditions can be produced, including those which absorb light efficiently to maintain a high temperature while keeping good ventilation, or which reflect light considerably to prevent the inside temperature from rising excessively. Greenhouses that provide various basic inside environments can be constructed by using a combination of narrow strips of appropriate sizes and appropriate different colors, for instance black, white, gray or transparent, at appropriate portions.

Fourth, fabrics of the present invention are useful to produce functional, fashionable and comfortable footwear which has novel, fashionable appearance together with good waterproofness and high air permeability to permit the wearer to feel cool and dry especially in summer.

The footwear as proposed herein includes sports shoes, boots, slippers, sandals and other indoor footwear as well as various shoes for daily use.

Figure 12:
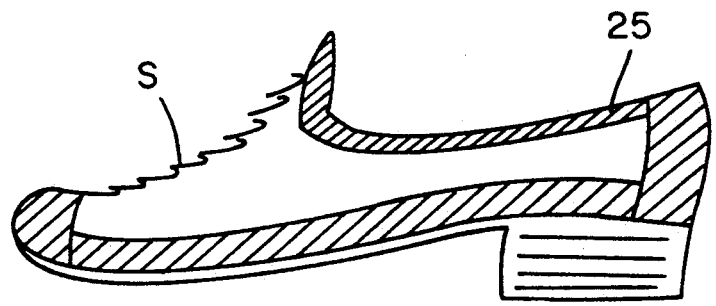

FIG. 12 schematically illustrates a cross section of shoe 25 comprising fabric S of the invention. Narrow strips with a hook-like cross section are used in this example.

For footwear of the invention, it may be practical to use a fabric with an overlap structure of the invention in such a way that the downward direction of the overlap structure virtually coincides with that of the footwear. However, there are no specific requirements for the use direction of the structure. Narrow strips may be used in any desired direction depending on the desired fashionable features and appearance.

Footwear having a novel and highly fashionable design that was not available in the past can be produced by using a combination of a large number of narrow strips which are different in color, hue and shade.

Furthermore, footwear with multiple functions can be produced by using a combination of narrow strips of different materials. For instance, footwear with many good properties including waterproofness, water absorption and air permeability can be produced by using double-woven fabric strips in which the inside layer to come in contact with the body is made of cotton while the other layer to be exposed to rain is coated with synthetic polymer film containing fine pores.

Fifth, fabrics of the invention serve to produce novel perishables storage containers that provide an environment which is well screened from sunlight, well ventilated and therefore suitable for the transportation and storage of perishables.

Conventional flexible containers, for instance, have been generally used for the transportation of powder and particle materials including livestock feed, but not for perishables including grain, vegetables, fruits, fish, shellfish and flowers because no materials have been available which can provide an environment suitable for their transportation. Fabrics with a special structure of the invention, however, serve to produce novel perishables containers which can provide an environment suitable for the transportation and storage of these perishables.

The perishables storage containers as proposed herein include all boxes, bags and tubes designed to contain perishables including perishable plants as well as perishable foods such as grain, vegetables, fruits, fish, shellfish and flowers in order to transport them by land, sea or air or to preserve or store them.

Figure 13:
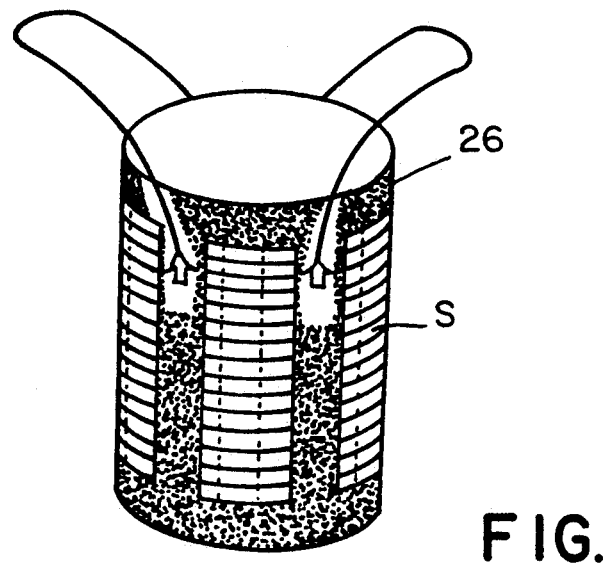

FIG. 13 schematically illustrates and example of tubelike bag for transportation which is made of a perishables storage material of the invention. The side wall of storage bag 26 is made of fabric with an overlap structure S of the invention.

Such perishables storage containers have good functions and effects as described below.

(1) The fabrics serve to produce perishables transporting containers which prevent the contents from being exposed to direct sunlight and maintain good ventilation. Thus, these containers are highly suitable for the storage and transportation of vegetables and other foods which require good ventilation and shade.

(2) They serve for easy production of containers which have high waterproofness, light-screening ability and moisture permeability as well as high air permeability and therefore, they are highly suitable for the transportation of perishables.

(3) The use of a combination of various narrow strips of difference materials and colors permits the production of novel containers for the transportation, preservation or storage of perishables with colorful and fashionable appearance.

With such a colorful feature, these fabrics serve for easy production of containers of different colors for easy identification of the contents such as vegetables and fruits.

(4) If narrow strips of an appropriate size and of an appropriate color or appropriate different colors are used at appropriate portions, it is possible to produce containers which maintain good ventilation while absorbing light efficiently to keep a high temperature or which reflect light considerably to prevent the inside temperature from rising excessively.

If a proper combination of various narrow strips of an appropriate size and appropriate different colors, for instance black, white, gray and/or transparent, is used at appropriate portions, it is basically possible to produce containers which provide any desired inside environment.

In addition to these, fabrics of the invention can be applied to a wide variety of products including curtains, partitions and chair covering materials as well as beach umbrellas and tents with high air permeability to ensure coolness and comfortability.

Some examples are given below to further illustrate the present invention, and not by way of limitation.

EXAMPLE 1

Narrow fabric strips of 36 mm wide were woven with a ribbon weaving machine using 30-denier (D), 12-filament polyester yarn as warp and weft. The yarn density of the strips was 80 warp threads and 26 weft threads per centimeter.

The narrow strips were immersed in a water-soluble polyvinyl alcohol adhesive and then wound up on a cylindrical roll coated with fluoropolymer while rotating the roll at 1 m/min and shifting each strip by a required distance so that the width of the overlap between them would be 18 mm. The sheet thus obtained was then dried and cut in the direction of the axis of the roll to provide fabric in which the narrow strips were temporarily fixed with the above-mentioned water-soluble adhesive.

Then, the fabric sheet was sewn with a plurality of sewing yarns utilizing a conventional sewing machine in the width direction of the narrow strips and in the downward direction of the fabric (so that the narrow strips would not be turned up) by a plurality of sewing lines parallel to each other with a regular space of 43 mm interposed therebetween, followed by immersion in hot water of 80° C. to dissolve and remove the water-soluble adhesive.

Thus, a fabric sheet with an overlap structure of the invention which had a width of 36 mm, overlap width of 18 mm and sewing line interval of 43 mm was obtained.

A piece of golf wear was produced from the fabric by sewing. Though it was sultry and the sunlight was strong on the day of testing, it was revealed that the fabric screened the skin from the sunlight effectively and had a high air permeability, and further, had a suitable handling touch and very comfortable, demonstrating that the fabric was very suitable as material for golf wear.

EXAMPLE 2

Narrow fabric strips of 10 mm wide were woven with a ribbon weaving machine using, as warp and weft, mixed-yarns produced by combining conventional type polyester filament yarns (30D, 12F, shrinkage rate in boiling water 7%) and isophalate-copolymerized polyester filament yarns (30D, 12F, shrinkage rate in boiling water 18%) and interlaced with each other by utilizing a air jet nozzle. The yarn density thereof was 56 warp threads and 20 weft threads per centimeter.

The strips were connected to each other temporarily with a water-soluble adhesive and sewn with a sewing machine in the width direction of the strips to form a fabric sheet by the same method as in Example 1. They were sewn with a plurality of sewing lines arranged in parallel to each other with an interval of 5 mm interposed therebetween.

Then, a high-pressure paddle dyeing apparatus was used to immerse the sheet in boiling water to dissolve and remove the water-soluble adhesive while allowing a difference in shrinkage rate to develop, followed by dyeing the sheet deep brown with a disperse dye by a conventional dyeing process. The dyed and dried fabric sheet was then subjected to treatment for water and oil repellency. The water and oil repellent agent used was Asahi Guard AG-710 Emulsion (supplied by Asahi Glass Co., Ltd.) in the form of 6% aqueous solution. It was used with 0.1% Sumitex Accelerator Acx (supplied by Sumitomo Chemical Co., Ltd.) as catalyst. The solution for water and oil repellent treatment was applied to the fabric in the downward direction by light padding, followed by drying at 100° C. and heat treatment at 180° C. for 30 seconds to provide the final fabric product.

The fabric was then used to produce a raincoat as schematically illustrated in FIG. 3 and a test of the raincoat was performed. High-density waterproof plain fabric coated with a water repellent agent was used as material for the collar, shoulders and elbows.

It was demonstrated that the raincoat had good features including high air permeability, waterproofness, moistureproofness and fashionability with attractive surface, which are not available in conventional commercial rain coats.

EXAMPLE 3

Narrow strips of polyester yarn as described in Example 1 and those of Nylon 6 yarns that had the same dimensions as the former were attached alternatingly to a plate made of fluorine-contained polymer with an overlap width of 15 mm using the same water-soluble adhesive as used in Example 1.

After drying, they were sewn together by the same procedure as in Example 1 with sewing line intervals of 20 mm. Then, a paddle dyeing apparatus was employed to perform hot water treatment at 80° C. for dissolution and removal of the water-soluble adhesive and to dye the Nylon 6 strips yellow with an acid dye at 100° C., followed by drying.

A summer sweater was produced by sewing the fabric and put on for testing. Because of the overlap structure, the skin was not seen through the fabric and so it can be worn directly next to the skin. The fabric appeared moderately bulky and dry because of the difference in processing characteristics between the polyester and polyamide fiber. It had a suitable handling touch and high air permeability with a good tanning control ability. Furthermore, it had good functions, fashionability and striped appearance with the combination of the yellow and natural color or off-white of the polyester.

EXAMPLE 4

Narrow towel-cloth strips of 7 mm wide were woven using cotton threads as warp and weft.

The strips were immersed in a water-soluble polyvinyl alcohol adhesive and then wound up on a fluoropolymet-coated cylindrical roll rotating at such a speed as to produce fabric with a required width and with an overlap width of 3 mm.

A sheet thus obtained was dried and cut in the direction of the axis of the roll to obtain fabric consisting of narrow strips temporarily fixed with the above-mentioned water-soluble adhesive.

The sheet was sewn with a conventional sewing machine along lines aligned at intervals of 20 mm in the "downward" direction so that the strips could not be turned up to provide multi-layer fabric with an overlap structure.

The fabric was the used to produce a towel-cloth blanket for summer use as illustrated in FIG. 9. The blanket is fringed with conventional polyester fabric, which serves also for reinforcement. It was then immersed in hot water of 80° C. to dissolve and remove the water-soluble adhesive.

Thus, a towel-cloth blanket was obtained in which 7 mm-width strips forming an overlap structure with a overlap width of 3 mm as illustrated in FIG. 1 were sewn together along parallel lines aligned at intervals of 20 mm. Although it was very sultry on the night of the test and one would have been unable to speed well under a conventional blanket, the towel-cloth blanket, with moderate heat insulation and dry surface texture together with a high air permeability and moisture permeability, was found to be very comfortable and highly suitable for summer use.

EXAMPLE 5

Narrow fabric strips of 20 mm wide were produced with a tape weaving machine using 500-denier, 36-filament polyester yarn and 250-denier, 48-filament polyester yarn as warp and weft, respectively.

The strips were immersed in a water-soluble polyvinyl alcohol adhesive and then wound up on a cylindrical roll coated with fluorine contained polymer rotating at such a speed as to produce a sheet with a required width and with an overlap width of 7 mm. A sheet thus obtained was dried and cut in the direction of the axis of the roll to obtain fabric consisting of narrow strips temporarily fixed with the above-mentioned water-soluble adhesive.

The temporarily fixed sheet was double-sewn with an industrial sewing machine along parallel lines aligned at intervals of 20 mm in the "downward" direction so that the strips would not be turned up, in order to provide multi-layer fabric with an overlap structure as illustrated in FIG. 1(A) and (B). The fabric was then immersed in hot water of 80° C. to dissolve and remove the above-mentioned adhesive.

Thus, a sheet was obtained in which 20 mm-width strips forming an overlap structure with a overlap width of 7 mm as illustrated in FIG. 10 were sewn together along parallel lines aligned at intervals of 20 mm.

The sheet was compared with coarse-pitch needle-punched non-woven fabric which had been used conventionally for retention of soil and sand.

These two fabric sheets were subjected to a test. Weak soil and sand containing much water was put on each sheet under the same conditions to determine their water discharge ability. It was shown that the soil and sand fixing sheet of the present invention discharged water without allowing the soil and sand to flow away but leaving an appropriate moisture, while the conventional needle-punched non-woven sheet allowed large amounts of soil, sand an water to flow away with some holes clogged, indicating that the latter was failed to work well.

EXAMPLE 6

Narrow fabric strips of 25 mm wide were produced with a tape weaving machine using 50-denier, 24-filament nylon yarn and 100-denier, 48-filament nylon yarn as warp and weft, respectively.

The strips were immersed in a water-soluble polyvinyl alcohol adhesive and then wound up on a fluoropolymer-coated cylindrical roll rotating at such a speed as to produce a sheet with a required width and with an overlap width of 4 mm. A sheet thus obtained was dried and cut in the direction of the axis if the roll to obtain fabric consisting of narrow strips temporarily fixed with the above-mentioned water-soluble adhesive.

The sheet was sewn with a conventional sewing machine along parallel lines aligned at intervals of 20 mm in the "downward" direction so that the strips wound not be turned up, in order to provide multi-layer fabric with an overlap structure.

The fabric was then immersed in hot water of 80° C. and then washed in water to dissolve and remove the above-mentioned adhesive. The fabric thus obtained was dried to provide a sheet in which 25 mm-width strips forming an overlap structure with an overlap width of 4 mm as illustrated in FIG. 1(A) and (B) were sewn together along parallel lines aligned at intervals of 20 mm.

The sheet was then used to construct a horticultural greenhouse as schematically illustrated in FIG. 11, and foliage plants were cultivated in it. It was revealed that the greenhouse was able to provide a well-shaded, well-ventilated environment highly suitable for the cultivation of foliage plants. The plants grew rapidly without withering.

EXAMPLE 7

Narrow fabric strips of 12 mm wide were produced with a tape weaving machine using 50-denier, 24-filament nylon yarn and 100-denier, 48-filament nylon yarn as warp and weft, respectively.

The strips were immersed in a water-soluble polyvinyl alcohol adhesive and then wound up on a fluoropolymer-coated cylindrical roll rotating at such a speed as to produce a sheet with a required width and with an overlap width of 6 mm.

A sheet thus obtained was dried and cut in the direction of the axis of the roll to obtain fabric consisting of narrow strips temporarily fixed with the above-mentioned water-soluble adhesive.

The fabric sheet was sewn with a conventional sewing machine along parallel lines aligned at regular intervals of 20 mm in the "downward" direction so that the strips would not be turned up.

The fabric was then immersed in hot water of 80° C. to dissolve the above-mentioned adhesive. The fabric thus obtained was dried and treated for water and oil repellency.

The water and oil repellent agent used was Asahi Guard AG-710 (Asahi Glass Co., Ltd.) in the form of 5% solution. The fabric was put into the solution in the downward direction of the multi-layer structure and wrung lightly in a mangle, followed by drying at 90° C. for 5 minutes and curing at 150° C. for 3 minutes to provide a fabric sheet with a special overlap structure of the invention as shown in FIG. 1(A) and (B) which consists of 12 mm-width narrow strips forming overlaps with an overlap width of 6 mm and sewn together along parallel lines aligned at intervals of 15 mm.

The sheet was then used to produce low shoes for summer use as illustrated in FIG. 12. They were fringed with conventional synthetic leather, which served also for reinforcement.

The shoes were put on for testing. Though it was very sultry and conventional shoes would have been very stuffy on the day of test, it was demonstrated that the low shoes of the invention was very comfortable and suitable for summer use because of high air permeability, moisture permeability and waterproofness and also because the fabric with slightly rough surface was agreeable to the touch.

EXAMPLE 8

Narrow fabric strips of 30 mm wide were produced with a tape weaving machine using 500-denier, 36-filament polyester yarn and 250-denier, 48-filament polyester yarn as warp and weft, respectively.

The strips were immersed in a water-soluble polyvinyl alcohol adhesive and then wound up on a fluoropolymer-coated cylindrical roll rotating at such a speed as to produce a sheet with a required width and with an overlap width of 6 mm. A sheet thus obtained was dried and cut in the direction of the axis of the roll to obtain fabric consisting of narrow strips temporarily fixed with the above-mentioned water-soluble adhesive.

The fabric sheet was sewn with a conventional sewing machine along parallel lines aligned at regular intervals of 20 mm in the "downward" direction so that the strips would not be turned up to provide fabric consisting of narrow strips temporarily fixed with the above-mentioned water-soluble adhesive.

The fabric was then immersed in hot water of 80° C. and washed in water to dissolve and remove the above-mentioned adhesive, followed by drying. Thus, a fabric sheet with a special overlap structure of the invention as shown in FIG. 1(A) and (B) was obtained which consisted of 30 mm-width narrow strips forming overlaps with an overlap width of 5 mm and sewn together along parallel lines aligned at intervals of 20 mm.

The sheet was then used to produce a tube-like bag as schematically illustrated in FIG. 13, and the bag was subjected to a test for the transportation of vegetables. It was demonstrated that the bag was able to provide a well-shaded, well-ventilated environment highly suitable for the transportation and storage of vegetables. The vegetables under test were stored without withering for a long period of time.

POSSIBLE INDUSTRIAL APPLICATIONS

The fabrics with a special structure of the present invention have high air permeability, light-screening ability and waterproofness, which are generally difficult to achieve simultaneously, and also have high fashionability.

If used as material for clothing, they can form clothes with completely unique functions including the ability to prevent the skin of the swearer from being exposed directly to sunlight or rain water while maintaining very good ventilation and fashionable appearance.

For instance, the fabrics can be used as material for various clothes, especially for outdoor wear including sportswear such as golf wear, baseball uniform, baseball undershirt and tennis wear; casuals such as T-shirt and polo shirt; and rainwear such as raincoat.

As described previously, the fabrics of the invention, with good features and functions, also serve as material for various clothing items other than clothes, bedclothes, soil and sand fixing sheets, agricultural and horticultural greenhouses, footwear, perishables storage containers, beach umbrellas, various tents, filters, chair coverings, partitions and curtains. Thus, they are useful for an extremely wide variety of products.

We claim:

1. A method of making a fabric of overlapping strips comprising arranging a large number of narrow strips in parallel to each other and one on top of another to form an overlapping structure, said strips having longitudinal side portions of said strips overlapping each other to form an overlap structure, the steps wherein said narrow strips are temporarily attached to each other with an adhesive, connecting permanently the narrow strips at spaced-apart locations, and removing the adhesive so that said narrow strips are permanently connected at said spaced-apart locations, while unconnected portions are provided between said locations.

2. The method defined in claim 1, further comprising arranging said narrow strips on a take-up roll one on top of another while slightly shifting a position thereof so that adjacent strips partly overlap each other to form an overlapping structure.

3. A method of making a fabric of overlapping narrow strips comprising:

orienting the narrow strips one on top of another on a rotating roll, wherein the narrow strips are caused to partially overlap each other with narrow slits extending between said narrow strips;

temporarily bonding said narrow strips with adhesive;

cutting the temporarily bonded narrow strips along the axis of the roll to provide a sheet of overlapping narrow strips;

locally joining the bonded narrow strips in their width direction to produce a joined sheet, with slits extending between said narrow strips; and immersing said joined sheet in a solvent for said adhesive to dissolve said adhesive to form said fabric of overlapping narrow strips.

4. The method of claim 3 comprising the further step of forming said narrow strips into a useful article before dissolving said adhesive.

5. The method of claim 3 further comprising the step of subjecting the temporarily bonded narrow strips to water repellency treatment before dissolving said adhesive.

* * * * *